(12) United States Patent
Klement et al.

(10) Patent No.: US 6,910,330 B2
(45) Date of Patent: Jun. 28, 2005

(54) METHOD FOR CONTROLLING THE POWER CONSUMPTION OF A HYDRODYNAMIC CLUTCH BY CONTROLLING THE VOLUMETRIC EFFICIENCY AND A HYDRODYNAMIC CLUTCH

(75) Inventors: Werner Klement, Heidenheim (DE); Klaus Vogelsang, Crailsheim (DE); Peter Edelman, Heidenheim (DE); Heinz Höller, Crailsheim (DE); Jürgen Friedrich, Crailsheim (DE)

(73) Assignee: Voith Turbo GmbH & Co., KG, Heidenheim (DE)

( * ) Notice: Subject to any disclaimer, the term of this patent is extended or adjusted under 35 U.S.C. 154(b) by 0 days.

(21) Appl. No.: 10/363,335

(22) PCT Filed: Aug. 29, 2001

(86) PCT No.: PCT/EP01/09934

§ 371 (c)(1),
(2), (4) Date: Apr. 24, 2003

(87) PCT Pub. No.: WO02/18811

PCT Pub. Date: Mar. 7, 2002

(65) Prior Publication Data

US 2003/0162632 A1 Aug. 28, 2003

(30) Foreign Application Priority Data

Aug. 30, 2000 (DE) .......................................... 100 42 865
Sep. 20, 2000 (DE) .......................................... 100 46 828

(51) Int. Cl.$^7$ .............................................. F16D 33/06
(52) U.S. Cl. ........................................................ 60/357
(58) Field of Search ................................... 60/357, 351

(56) References Cited

U.S. PATENT DOCUMENTS

| 1,914,289 A | 6/1933 | Pomeroy et al. |
| 2,110,454 A | 3/1938 | Sinclair .......................... 60/54 |
| 3,405,524 A | * 10/1968 | Marine .......................... 60/357 |

(Continued)

FOREIGN PATENT DOCUMENTS

| DE | 594 106 | 2/1934 |
| DE | 1 750 311 | 1/1971 |
| DE | 1 750 198 | 2/1971 |

(Continued)

*Primary Examiner*—Edward K. Look
*Assistant Examiner*—Michael Leslie
(74) *Attorney, Agent, or Firm*—Baker & Daniels

(57) ABSTRACT

A method for controlling the power consumption of a starting element (1) in the form of a hydrodynamic clutch (2). The clutch comprises an impeller (4) and a turbine wheel (5), which together form at least one toroidal working chamber (6) that can be filled with an operating medium, and is located in a drive train (3) with at least one other drive motor that can be coupled to the hydrodynamic clutch. The method is characterized in that the power consumption can be freely adjusted as a function of the volumetric efficiency of the hydrodynamic clutch and the method has the following characteristics: the supply or evacuation of the operating medium to or from the working chamber is influenced by the generation and introduction of a static superposition pressure in the closed rotating circuit; the operating medium is supplied or evacuated to or from the working chamber by the application of a superposition or influencing pressure to the operating medium level in the operating medium reservoir (40).

17 Claims, 2 Drawing Sheets

U.S. PATENT DOCUMENTS

| | | | |
|---|---|---|---|
| 3,476,219 A | 11/1969 | Lauer | 188/90 |
| 3,873,244 A | 3/1975 | Jaggi | 417/424 |
| 4,348,990 A | 9/1982 | Nolte et al. | 123/41.12 |
| 6,357,229 B1 | 3/2002 | Schust et al. | 60/357 |
| 6,698,195 B1 | 3/2004 | Hellinger | |

FOREIGN PATENT DOCUMENTS

| | | |
|---|---|---|
| DE | 29 38 706 | 4/1981 |
| DE | 205 731 | 1/1984 |
| DE | 33 29 854 | 3/1985 |
| DE | 33 35 259 | 4/1985 |
| DE | 37 21 402 | 1/1989 |
| DE | 43 42 103 | 6/1995 |
| DE | 197 06 652 | 7/1998 |
| DE | 199 01 296 | 7/2000 |
| EP | 0 801 244 | 10/1997 |
| EP | 0801244 | 10/2001 |
| FR | 2 276 516 | 1/1976 |
| GB | 363169 | 12/1931 |
| GB | 1 227 944 | 4/1971 |
| GB | 2 123 533 | 2/1984 |
| GB | 2 145 198 | 3/1985 |
| GB | 2 172 965 | 10/1986 |

\* cited by examiner

METHOD FOR CONTROLLING THE POWER CONSUMPTION OF A HYDRODYNAMIC CLUTCH BY CONTROLLING THE VOLUMETRIC EFFICIENCY AND A HYDRODYNAMIC CLUTCH

BACKGROUND OF THE INVENTION

The invention relates to a method for controlling the power consumption of a hydrodynamic clutch, in particular as starting element in a drive train by controlling the volumetric efficiency.

During the starting process, i.e. the run-up of the drive motor and simultaneous transmission of torque on the output unit in a drive train, in particular in vehicles but also in stationary units, the problem of energy consumption of the drive motor is increasingly the center of attention since during this process usually too little energy for self-acceleration of the drive motor is available. As starting elements in vehicles hydrodynamic clutches are used for this purpose among other things. They are well-known in a multiplicity of designs. Reference is made to the publication Voith:"Hydrodynamics in motive power engineering", Vereinigte Fachverlage, Krauskopf Engineer Digest, Mainz 1987. The starting elements are usually integrated in a gear box unit. The gear box unit has for this a first hydrodynamic transmission part and a further second transmission part, which is usually preferably formed by a mechanical transmission part for application in vehicles. Since the power consumption of the hydrodynamic clutch is dependent on its design and not on a machine, which is at least indirectly connected to the hydrodynamic clutch on the output side, during the installation of such a component between a drive motor and a machine it is to be considered that for each load condition between the machine and the hydrodynamic clutch also a state of equilibrium must be ensured between the drive motor and the hydrodynamic component. Thereby the power released by the drive motor is in the rarest case completely available to the gear unit, in particular the hydrodynamic component, during the starting process. Power for auxiliary machines, like for example fans, generators, pumps and so on, which are positioned before the starting element respectively the gear inlet, must thereby be subtracted from the available drive power. For the use of a hydrodynamic component in form of a hydrodynamic clutch the following specified benefits of the hydrodynamic power transmission are thereby desirable for the starting process: wear-free as well as vibration reducing and thermally stable. In connection with drive motors for different application functions concrete demands are made regarding the transfer characteristic also during the starting process. In particular for the application in vehicles a certain behavior during the starting process, in particular a certain power consumption by the impeller of the hydrodynamic clutch, is desired in order to be able to drive the drive motor in an optimized operating range regarding a certain parameter. During the starting process at low speeds it is therefore required that a suitable surplus moment is present for the self-acceleration of the drive motor in order to realize a motor start-up that is relieved as much as possible.

SUMMARY OF THE INVENTION

It is therefore the task of the invention, to further develop a starting unit of the kind initially specified, in particular a method for controlling the power consumption, in such a manner that said starting units are suitable in particular for the application in drive trains of vehicles or other ranges of application, whereby besides the advantages of the hydrodynamic power transmission also a substantially relieved start-up of the drive motor should be ensured. The design of the starting unit should be characterized by a low expenditure for design, production and control and it should be economical. Furthermore the solution according to the invention, independently of the field of application at the hydrodynamic component, is to require only slight modifications.

According to the invention the power consumption as a function of its volumetric efficiency is freely adjustable with a method for controlling the power consumption of a starting element in form of a hydrodynamic clutch, comprising an impeller and a turbine wheel, which form with one another at least one toroidal working chamber that can be filled with operating medium, in a drive train with at least another drive motor that can be coupled with the hydrodynamic clutch. This possibility of free adjusting makes it possible, regarding different criteria, for example energy consumption and pollutant emission, to try to achieve optimized operating points in the characteristic diagram of the drive motor.

Thereby a change of the power to be received takes place by controlling the volumetric efficiency of the hydrodynamic clutch when a value is present, which characterizes the power desired to be received of the hydrodynamic clutch at least indirectly. The controlling of the volumetric efficiency takes thereby place preferably via creating and/or applying of an influence pressure on a resting medium, in particular on an operating medium level which arises in an operating medium reservoir within the scope of an operating medium utility system or on a control medium level. Thereby a portion of the operating medium in the working chamber is directed during the operation of the hydrodynamic clutch in a closed circuit between at least one outlet from the toroidal working chamber between impeller and turbine wheel and at least one inlet into the toroidal working chamber, whereby the inlet is connected with an operating medium reservoir which is pressure tight closed in relation to its surrounding. A manipulated variable is then created for the generation of an influence pressure on the medium resting in the operating medium reservoir and the servo unit is triggered. Filling or emptying takes place up to the point of reaching a pressure balance between the operating medium level in the operating medium reservoir and the rotary closed circuit.

A hydrodynamic clutch according to one form of the invention comprises at least two rotating circuit parts in the form of two impellers, which form with one another at least one toroidal working chamber, which can be filled with operating medium and in which a rotary working circuit arises during operation of the hydrodynamic clutch. An inlet and an outlet are assigned to the toroidal working chamber, which is connected with a closed circuit. Said working chamber comprises the working circuit and an external element, i.e. an element directed outside of the toroidal working chamber, which is connected with the working circuit. The external element of the circuit serves thereby among other things the purpose of directing the operating medium for the purpose of cooling. This closed circuit is designed according to the invention pressure tight. This means that the inlet, in particular the inlet area to the working chamber, and the outlet, in particular the outlet area are designed fluid tight in relation to the hydrodynamic clutch and that further the operating medium guide distance between the inlet and the outlet is completely sealed in the external element of the closed circuit, i.e. outside of the toroidal working chamber.

The solution according to the invention makes it possible that during operation of the hydrodynamic clutch operating medium is directed in the external element of the circuit with removal of operating medium from the working circuit into the external element of the closed circuit and, since the whole circuit is designed as a closed circuit, operating medium is again supplied to the inlet. Due to the pressure tight design a pressure in the closed system, created by the hydrodynamic clutch, is maintained during the operation of the hydrodynamic clutch, i.e. during rotation of an impeller and therefore by slaving at least another impeller by means of the working circuit. This circuit can be designated thereby by itself as cooling circuit, as heat can be dissipated by radiant heat over the line connections between the outlet and the inlet. Therefore already this design makes a cooling circuit possible.

If under a further aspect means for the generation of an influence pressure on the operating medium directed in the closed circuit are planned, the possibility consists to control additionally the volumetric efficiency of the hydrodynamic clutch.

Under a further aspect at least one junction location for the optional connection of means for the filling and/or emptying and/or means for the pressure default are arranged in the system in the closed circuit. The means for the pressure default are thereby preferably pressure tight connected to the closed circuit and serve the purpose of generating a static superposition pressure in the closed circuit. The means for the pressure default comprises preferably a pressure tight closed reservoir, which is pressure tight connected with the closed circuit. The pressure default takes place via applying a pressure on the reservoir level. Another possibility is the generation of a pressure through additional components, for example a suitable pump device.

The means for filling comprise an operating medium reservoir device and a means for the operating medium transport, for example pump devices. These serve also the purpose of loss compensation.

Under a further aspect of the invention the means for filling and emptying and the means for the pressure default are formed by a system for the purpose of the simplification of the overall system. Filling and emptying takes place preferably likewise by means of the reservoir, which is connected pressure tight to the closed system, and by applying pressure on the reservoir level or by pump devices.

An improvement of the invention contains the provision and/or the allocation of standing back pressure tubes to the diverting area, which is limited by a rotating housing component. Preferably a multiplicity of standing back pressure tubes is intended, which are arranged in a certain distance to each other in circumferential direction. The back pressure tubes function as a back pressure pump device when immersed into the diverting area and are connected with the line connections, which are connected with the diverting area. These convert the kinetic energy into pressure energy and create automatically a cooling circuit, which is required for ensuring the continuous operation of the hydrodynamic clutch. In a further design of the solution according to the invention means for the heat dissipation in the closed circuit are provided. These can be cooling devices or heat exchangers.

The hydrodynamic clutch designed as a starting element according to the invention is not limited to any specific application in drive trains. Application can take place in drive trains of stationary units or mobile devices, preferably in a vehicle.

BRIEF DESCRIPTION OF THE DRAWINGS

The solution according to the invention is in the following described using the following figures.

DETAILED DESCRIPTION

Figure 1:
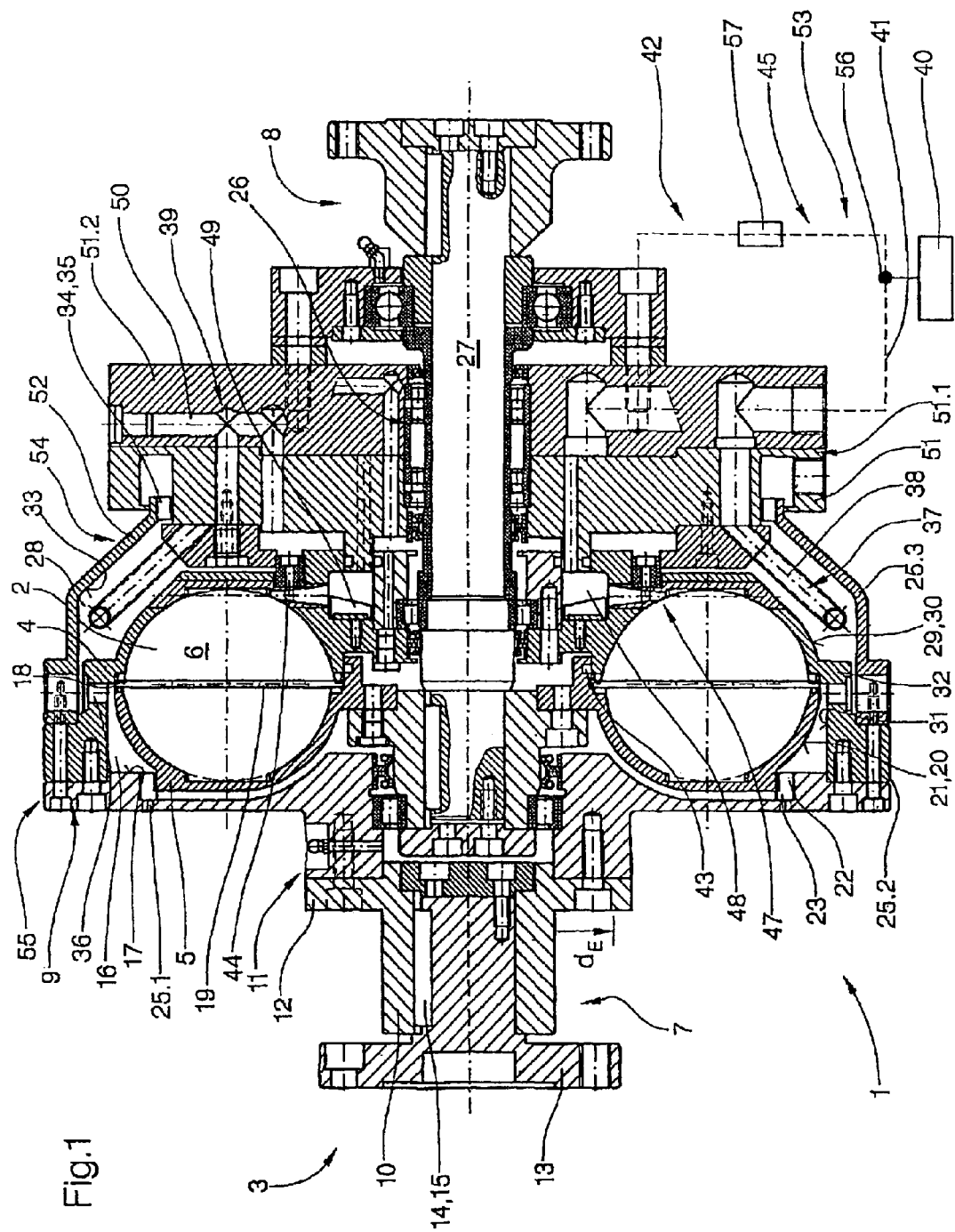
FIG. 1 illustrates a favorable design of a starting element in form of a turbo-clutch arranged according to the invention using a section of a drive train.

FIG. 1 illustrates a favorable design of a starting element 1 in form of a hydrodynamic clutch 2 arranged according to one form of the invention, in particular a turbo-clutch using a section of a drive train 3. The hydrodynamic clutch 2, in particular a turbo-clutch, comprises at least one primary wheel functioning as impeller 4 and a secondary wheel functioning as turbine wheel 5, which form with one another a toroidal working chamber 6. The starting element 1 comprises further one drive unit 7, that can be coupled at least indirectly with a drive motor (not shown), and one output unit 8 that can be coupled at least indirectly with the output unit at the drive system, i.e. indirectly via further transmission means or directly without inserting further transmission means. The output unit 8 can generally be coupled with a mechanical speed and/or torque transformer during the application in gear boxes. The drive unit 7 and the output unit 8 are formed for example in each case by a shaft or a hollow shaft or a flange. The hydrodynamic clutch 2 includes a housing 9, which is connected secured against torsion with the impeller 4 and consists because of assembly reasons preferably of a multiplicity of individual housing components 25.1 –25.3. The housing 9 is therefore likewise connected secured against torsion with the drive unit 7. In the represented case the housing 9 is therefore connected with a hub component 10, which is designed flange-like at its end 11 facing the starting element, whereby the mounting, respectively the connection, secured against torsion between the hub component 10 and the housing 9 takes place in the area of a flange 12 of the hub component 10. The drive of the hub component 10 takes place through a drive shaft 13, which can be connected at least indirectly, i.e. either directly or over further power transmission components with a drive motor not represented here, and through a suitable shaft-hub connection 14 which in the represented case is designed as key joint 15 between hub component 10 and drive shaft 13. Other design variations for the realization of a connection secured against torsion are likewise conceivable. The housing 9 encloses the turbine wheel 5 while forming a first gap 16 in axial direction. The first gap 16 is thereby limited by a housing inner wall 17 of a housing component 25.1, by an outlet 18 from the impeller in the range of the parting plane 19 between impeller 4 and turbine wheel 5, by the outer circumference 20 in the range of radially outer extension 21 of the turbine wheel 5, and by a further housing component 25.2, which is connected secured against torsion directly with the impeller 4 or which forms a structural unit with the impeller, in particular its inner surface 31. Means 22 are intended for sealing the gap 16 between the housing 9 and the turbine wheel 5. These means for sealing 22 comprise at least one non-contact sealing device 23, which is designed preferably in form of a labyrinth seal. The housing 9 forms further a second gap 28 with the impeller 4 and a further housing component 25.3, connected secured against torsion to the impeller, as well as a second housing 51 with rotates with relative speed in relation to the housing 9, is preferably however stationary, which is mounted via an arrangement of bearings 26 on a driven shaft 27 which forms the output unit 8 of the starting element 1. This second gap is essentially formed by the outer surface 29 of the impeller 4 in the radially outer portion 30, by the housing component 25.2, which carries the housing inner wall 31, and by an inner surface 33 of the housing component 25.3 of the housing 9, which at least partially encloses the impeller 4 in axial direction. The stationary housing 51 can be designed as one-piece or as multiple pieces. It can also rotate—depending on the connection to the output unit 8—with relative speed in relation to the rotation of the housing 9. A seal between the housing component 25.3 and a housing component 51.1 of the stationary housing 51, into which line connections 41 for the realization of a closed operating medium circuit 42 are integrated, is created by means 34 for sealing the gap 28 between the housing 9 and the housing 51, in particular the housing components 25.3 and 51.1. These means comprise at least a non-contact gasket 35, which is designed preferably in form of a labyrinth seal. The second gap 28 is connected at the housing component 25.2 with the first gap 16 via suitable transfer ports 36 in the housing wall 32. Means 37 for the removal of operating medium appears in the second gap 28 during the operation of the hydrodynamic clutch via the operating medium guide in the toroidal working chamber 6, are assigned to the second gap 28, said means being designed for example in the form of back pressure pumps 38. According to the desired amount of operating medium to be removed from the second gap 28 and the time period, which is available for the removal, preferably in dependence on the possible passage area, which is determined by the dimensioning of the back pressure pumps 38, a multiplicity of back pressure pumps 38 is provided, which are preferably arranged in symmetrical distances in circumferential direction in the gap 28, respectively submerged into the gap. The housing components 51.1 and 51.2 and the third housing component 25.3 form a back pressure pump housing 54, the housing component 25.3 for itself alone the impeller shell 52. The housing components 51.1 and 51.2 can also be designed as an integral unit, i.e. only one housing component is provided, which combines the housing components 51.1 and 51.2 as represented in FIG. 1. The means for the removal 37, in particular the back pressure pumps 38, are connected with means 39 for directing of operating medium in a closed circuit 42. The means 39 for directing the operating medium comprise therefore preferably line connections 41 in the form of operating medium channels 50, which are integrated into the housing wall facing the impeller 4 respectively into the housing components 51.1 and 51.2 of the housing 51. The rotating housing 25 and the housing 51, which is either stationary or rotating with relative speed to the housing 25, form the total housing 55 for the clutch 2. The operating medium utility system 53 comprises an operating medium reservoir 40, which is connected with the closed circuit 42 via a knot location 56, for example by means of a line connection. The operating medium reservoir 40 is preferably arranged in the area below the height of the toroidal working chamber 6, in particular within the outer radial dimensions of the individual impellers 4 or 5 in assembled position. In this case a safety device via a siphon or other aids can be omitted.

The operating medium reservoir 40 is thereby pressure tight connected with the inlet 44 into the toroidal working chamber 6 via the junction 56. The means for sealing 34 of the gap 28, in particular of the back pressure pump housing 54 and the impeller shell 52, as well as the means 22 for sealing between turbine wheel 5 and the rotating housing 9 of the starting unit 1 are spatially arranged in circumferential direction above the meridian center and below the maximum profile diameter of the two impellers, i.e. the impeller 4 and the turbine wheel 5. Furthermore means 43 are provided for sealing between impeller 4 and turbine wheel 5, whereby these means are arranged in radial direction inside the internal diameter dE of the toroidal working chamber 6. The closed circuit 42 is thus pressure tight in relation to its surrounding. The connection of the operating medium reservoir 40 to the closed circuit 42 takes place likewise pressure tight.

The housing of the starting unit 9, the impeller 4, the turbine wheel 5, the closed circuit 42 as well as the pressure tight connection of the operating medium reservoir 40 with the closed circuit 42 form means 45 for the generation of a pressure balance between a closed rotating circuit 42 and a resting medium. The closed circuit 42 is provided between the outlet 18 from the toroidal working chamber 6 in the area of the parting plane 19 and the inlet 44 into the impeller 4. The operating medium arrives from the flow circuit in the toroidal working chamber 6 via the outlets 18 in the area of the parting plane 19 of the impeller 4 and the turbine wheel 5 and via the connection channels into the second gap 28, from where the operating medium is directed via the means for the removal 37, in particular the back pressure pumps 38, into the closed circuit 42.

The inlet 44 is via the filling location 47 connected with the operating medium reservoir 40. In a particularly favorable design the filling location 47 is furthermore designed as bladed channel 48. This means that direction components 49, which extend in the direction of the flow toward the toroidal working chamber 6, are provided. The reduction of the operating medium stream via the outside impeller shell 52, formed by the housing component 25.3, preferably takes place via a multiplicity of stationary back pressure pumps 38, which are arranged to each other in circumferential direction preferably symmetrically. The circuit created for cooling purposes is thereby designed as closed circuit 42.

Figure 2:
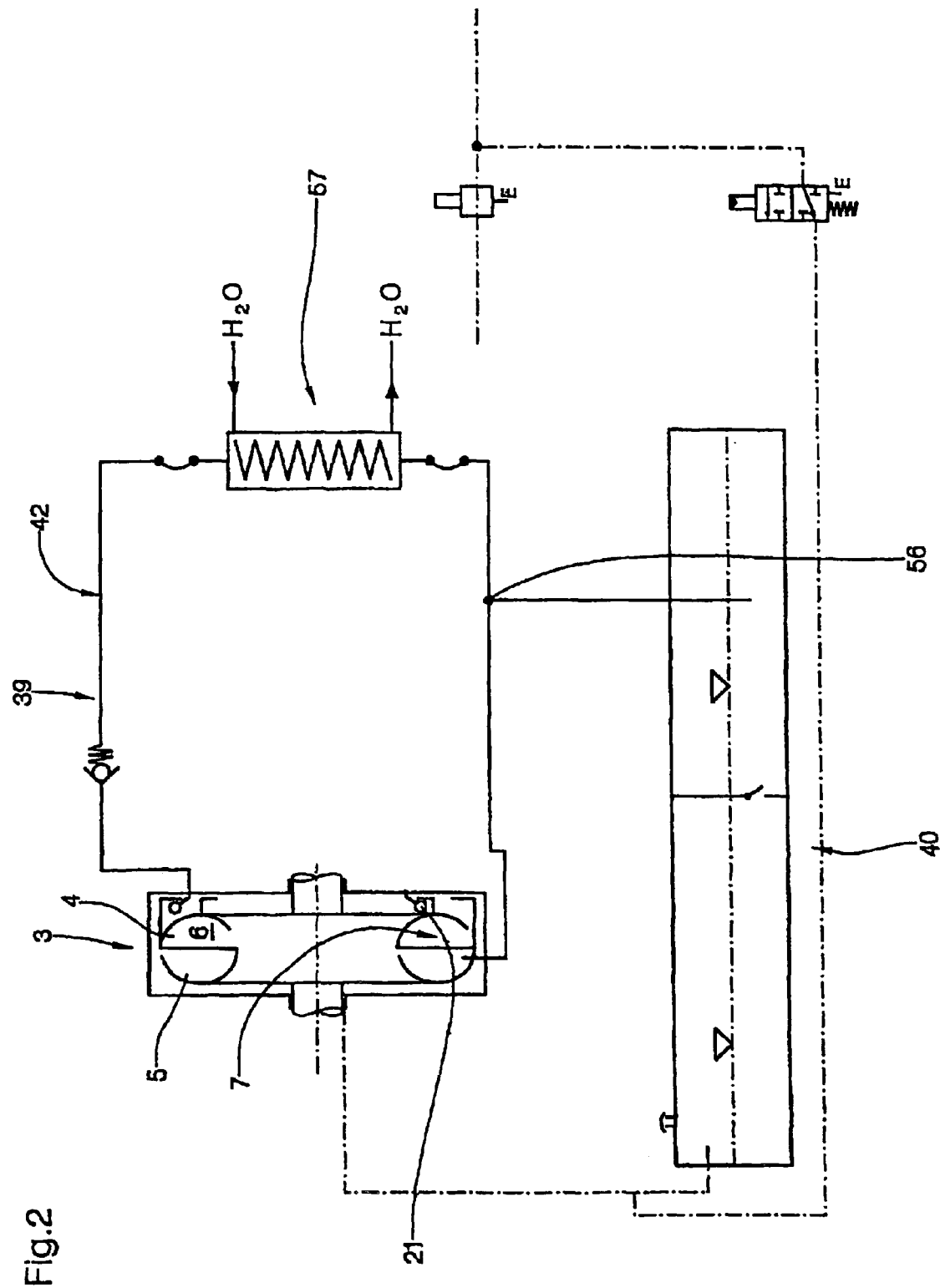
FIG. 2 illustrates the basic principle of the controlling of the volumetric efficiency using a diagrammatic representation of a hydrodynamic clutch and the operating medium utility system assigned to said clutch.

The working principle of the filling control by means of an outside pressure onto a resting medium is described in diagrammatic simplified representation in FIG. 2. This figure illustrates in diagrammatic simplified representation a hydrodynamic clutch 2, the closed circuit 42 assigned to the clutch, which is designed as a coolant circle, and the connection between the turbo-clutch 2 and the operating medium reservoir 40. The inlet into the working chamber 6 is shown to be arranged at the turbine wheel 5. The operating medium reservoir 40 is thereby for example designed as tank or vessel, whereby it can also be formed by the housing of the starting unit or of the gear box in which the starting element 1 is arranged. The operating medium reservoir 40 is thereby preferably arranged below the internal diameter $d_E$ of the toroidal working chamber 6. It is thereby crucial that the operating medium level is either below this dimension or it can be above, with the presence of suitable aids, for example in the form of siphons and/or valves. The closed coolant circuit 42 is designed between the toroidal working chamber 6 respectively the outlet 18 from the toroidal working chamber 6 and the filling location 47 of the toroidal working chamber 6. Means for the heat dissipation of operating medium 57 are for example arranged in said circuit. These means 57 comprise in the simplest case for example a heat exchanger or a cooling device. Directing the operating medium from the working chamber 6 into the working chamber 6 in the closed circuit 42 serves thereby mainly the purpose of cooling the operating medium, in particular the generation of a continuous cooling operating medium flow. The operating medium utility system comprises a pressure tight designed operating medium reservoir 40, for example in form of an operating medium sump in a reservoir, a tank or a housing, which can be connected via at least one connection channel with the closed circuit 42 in the area of the inlet 44. The operating medium reservoir 40 is thereby preferably arranged in such a manner that the arising operating medium level is arranged underneath the toroidal working chamber 7. An influence pressure $P_B$ for the change of the volumetric efficiency FG is applied on the operating medium level, whereby said influence pressure during effect on the closed sump allows operating medium to enter the working circuit in the toroidal working chamber via connection channels, until the pressure within the area of the inlet 21 after the heat exchanger creates a pressure balance. Filling or emptying takes place until a pressure balance between the operating medium level in the operating medium reservoir and the rotary closed circuit arises.

Furthermore, as shown in FIG. 1, the profiles of the turbine wheel 5 and the impeller 4 are offset in radial direction against each other by a certain value in such a manner that the outside profile diameter of the turbine wheel 5 exhibits a larger dimension in radial direction than the outside profile diameter of the impeller 4 and the interior profile diameter of the turbine wheel 5 exhibits likewise a larger dimension than the internal diameter of the impeller profile.

A change of the ideal torus-symmetrical form can take place moreover via a profile offset.

The back pressure pumps 38 supply with emptied turbo-clutch 2, when all circuit parts are free of operating medium, a flow rate and an oil pressure for cooling or for actuation for other consumers, like for example a wet-running mechanical clutch.

Further favorable designs include means for the improvement of the filling of the working chamber, i.e. the pump characteristic, by providing elements built into the filling area 48 connected with the filling location 47. These elements built in can be designed as filling blades 49, perforated plate packages or similarly designed areas. Furthermore it is conceivable to design the filling of the impeller 4 through several blade cascades in arbitrary parts of the torus or through the blade itself, for example a stamped channel to the torus center.

Further improvements can have the blades of impeller 4 and turbine wheel 5 designed with different blade angles. Additionally or as an individual solution the blades of impeller 4 and turbine wheel 5 can be sharpened differently, which entails into different dimensions across the extension in circumferential direction of the individual blade. Another possibility consists of changing the entry angles and outlet angles between impeller and turbine wheel or to provide a different number of blades in the mounting of blades of impeller 4 and turbine wheel 5.

1 Starting element
2 Turbo-clutch
3 rive train
4 Impeller
5 Turbine wheel
6 Toroidal working chamber
7 Drive unit
8 Output unit
9 Housing
10 Hub component
11 End range facing the starting element
12 Flange
13 Drive shaft
14 Shaft-hub connection
15 Key joint
16 Gap
17 Housing inner wall
18 Outlet
19 Parting plane
20 Outer circumference
21 Radially outer extension
22 Means for sealing
23 non-contact sealing device
25.1, 25.2,
25.3 Housing component
26 Arrangement of bearings
27 Driven shaft
28 Gap
29 Outer surface
30 radially outer range
31 Inner surface
32 Housing wall
33 Inner surface
34 Means for sealing the gap 28
35 Non-contact gasket
36 Transfer port
37 Means for the removal of operating medium from the working chamber
38 Back pressure pump
39 Means for directing the operating medium
40 Operating medium reservoir
41 Line connections
42 Closed circuit
43 Means for sealing between impeller and turbine wheel
44 Inlet
45 Means for the generation of a pressure balance between a closed rotating circuit and a round medium
47 Filling location
48 Filling area
49 Bladed direction components
50 Operating medium channels
51 Resting housing component
52 Impeller shell
53 Operating medium utility system
54 Back pressure pump housing
55 Total housing
56 Knot location
57 Means for heat dissipation
$d_E$ Inner diameter of the toroidal working chamber

What is claimed is:

1. A method for controlling the power-consumption of a starting element (1) in form of a hydrodynamic clutch (2), comprising an impeller (4) and a turbine wheel (5), which form with one another at least one toroidal working chamber that can be filled with an operating medium (6), and is located in a drive train (3) with at least one other drive motor that can be coupled to the hydrodynamic clutch (2), wherein the power consumption can be freely adjusted as a function of the volumetric efficiency of the hydrodynamic clutch (2), the method comprising:

directing at least one portion of the operating medium in the working chamber (6) during the operation of the hydrodynamic clutch (2) in a closed rotating circuit (42) between at least one outlet (18) from the toroidal working chamber (6) between the impeller (4) and turbine wheel (5) and at least one inlet (44) into the toroidal working chamber (6);

influencing the supply of operating medium to the working chamber (6) or the removal of operating medium from the working chamber (6) by the generation and introduction of a static superposition pressure into the closed rotating circuit;

supplying or removing the operating medium to or from the working chamber (6) via an operating medium reservoir (40) which is pressure tight connected to the inlet (44) in the toroidal working chamber (6);

wherein the supple of operating medium to the working chamber (6) or the removal of operating medium from the working chamber (6) takes place by applying a superposition or influence pressure to the operating medium level of the operating medium reservoir (40); and wherein when a value is present which characterizes the power desired to be received of the hydrodynamic clutch (2) at least indirectly, creating a manipulated variable for the generation of an influence pressure on the operating medium resting in the operating medium reservoir (40), and triggering a servo unit that generates the influence pressure.

2. The method according to claim 1, wherein a value is present which characterizes the power desired to be desired to be received of the hydrodynamic clutch (2) at least indirectly, said value controls the volumetric efficiency of the hydrodynamic clutch (2) in order to change the power to be received.

3. The method according to claim 1, wherein the duration of the filling or emptying process is characterized by the length of time for the adjustment of a pressure balance between the operating mediums present in the operating medium reservoir (40) and the closed rotating circuit (42) of the operating medium.

4. The method according to claim 1, and accomplishing the filling and/or emptying of a complete filling in a time period of equal or smaller than 1s.

5. The method according to claim 1, and controlling the influence pressure in dependence of at least one of the following parameters:
    speed of the impeller;
    value of the torque at the impeller;
    value of the torque at the turbine wheel,
    speed of the turbine wheel.

6. The method according to claim 1, wherein the value of the component current of the operating medium present during the operation of the hydrodynamic clutch (2) in the working chamber (6), which is directed in a closed circuit (42) between at least one outlet (18) from the toroidal working chamber (6) between the impeller (4) and turbine wheel (5) and at least one inlet (44) into the toroidal working chamber (6) is controlled independently of an effect on the power consumption dependent on the temperature in the working circuit in the toroidal working chamber (6).

7. A hydrodynamic clutch (2), comprising:
    an impeller (4) and a turbine wheel (5), which form with one another at least one toroidal working chamber (6);
    means for directing the operating medium in a closed circuit of at least one outlet (18) from the toroidal working chamber (6) into at least one inlet (44) of the toroidal working chamber (6);
    the closed circuit (42) being pressure tight;
    a junction (56) in the closed circuit (42);
    means for the optional connection of means for the filling and/or emptying and/or means for the influence of the pressure of the operating medium which is directed in the closed circuit (42) to the junction (56);
    a housing (9) which is connected secured against torsion with the impeller (4);
    the housing (9) enclosing the turbine wheel (5) in axial direction while forming a first gap (16);
    the first gap (16) limited by the outer circumference of the turbine wheel (5), whereby a non-contact sealing device (23) is provided between the housing (9) and turbine wheel (5);
    the housing (9) forming a second gap (28) with a stationary housing component (51) into which means (37) submerge for the removal of operating medium from the impeller shell (52);
    a seal at the second gap (28) between the housing (9) and a round housing component (51);
    a seal between the impeller (4) and the turbine wheel (5) below the inside diameter ($d_E$) of the toroidal working chamber (6).

8. The hydrodynamic clutch (2) according to claim 7, comprising:
    an operating medium utility system (53) comprising an operating medium reservoir (40) connected with the inlet (44) into the toroidal working chamber (6); and
    a pressure tight connection between the operating medium reservoir (40) and the inlet (44).

9. The hydrodynamic clutch according to claim 7, wherein the means (37) for the removal of operating medium comprises at least one stationary back pressure pump device (38).

10. The hydrodynamic clutch (2) according to claim 7 wherein:
    the inlet (44) is connected with a filling area (48) via a filling location (47);
    the filling location (47) is designed as a bladed channel (48) comprising direction components (49).

11. The hydrodynamic clutch (2) according to claim 10, wherein the direction components (49) extend in the direction of the flow toward the toroidal working chamber (6).

12. The hydrodynamic clutch (2) according to claim 7 wherein the profiles of the turbine wheel (5) and the impeller (4) are offset by a certain value in the radial direction.

13. The hydrodynamic clutch (2) according to claim 12, wherein the outside profile diameter of the turbine wheel (5) in the working chamber has in the radial outward direction a larger dimension than the outside profile diameter of the impeller (4) in the working chamber.

14. The hydrodynamic clutch (2) according to claim 7 wherein the inlet (44) into the toroidal working chamber (6) is provided at the impeller (4).

15. The hydrodynamic clutch (2) according to claim 14, wherein the inlet into the toroidal working chamber takes place via the blades.

16. The hydrodynamic clutch (2) according to claim 14, wherein the filling of the toroidal working chamber (6) takes place in the area of the statically lowest pressure into the working chamber (6).

17. A hydrodynamic clutch (2), comprising:
    an impeller (4) and a turbine wheel (5), which form with one another at least one toroidal working chamber (6);
    means for directing the operating medium in a closed circuit of at least one outlet (18) from the toroidal working chamber (6) into at least one inlet of the toroidal working chamber (6);
    the closed circuit (42) being pressure tight;
    a junction (56) in the closed circuit (42);
    means for the optional connection of means for the filling and/or emptying and/or means for the influence of the pressure of the operating medium which is directed in the closed circuit (42) to the junction (56); the inlet into the toroidal working chamber (6) is arranged at the turbine wheel (5).

* * * * *

UNITED STATES PATENT AND TRADEMARK OFFICE
CERTIFICATE OF CORRECTION

PATENT NO. : 6,910,330 B2
DATED : June 28, 2005
INVENTOR(S) : Werner Klement et al.

It is certified that error appears in the above-identified patent and that said Letters Patent is hereby corrected as shown below:

Column 8,
Line 48, delete "power-consumption" and insert -- power consumption --.

Column 9,
Line 7, delete "supple" and insert -- supply --.

Signed and Sealed this

Sixth Day of September, 2005

JON W. DUDAS
*Director of the United States Patent and Trademark Office*